J. C. MAXWELL.
CULTIVATOR.
APPLICATION FILED NOV. 9, 1909.
972,204.
Patented Oct. 11, 1910.
2 SHEETS—SHEET 2.
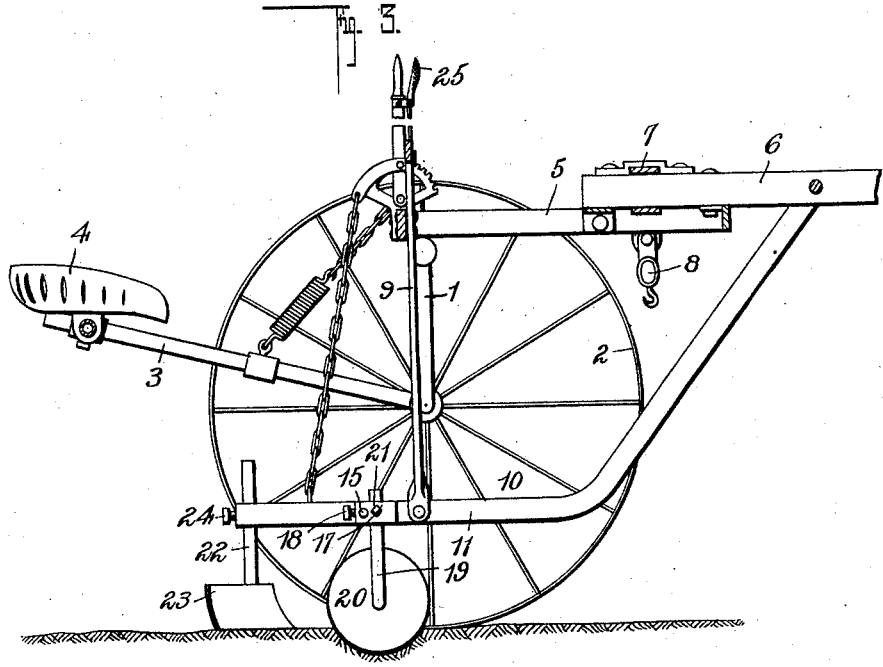
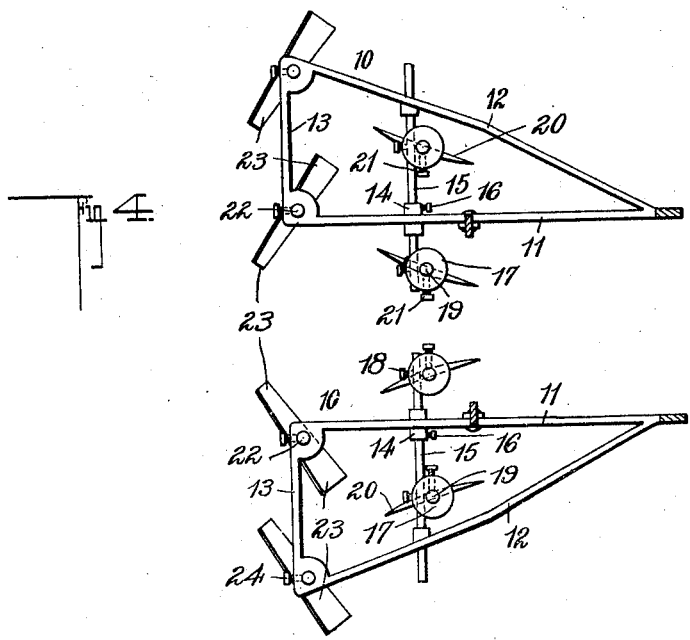

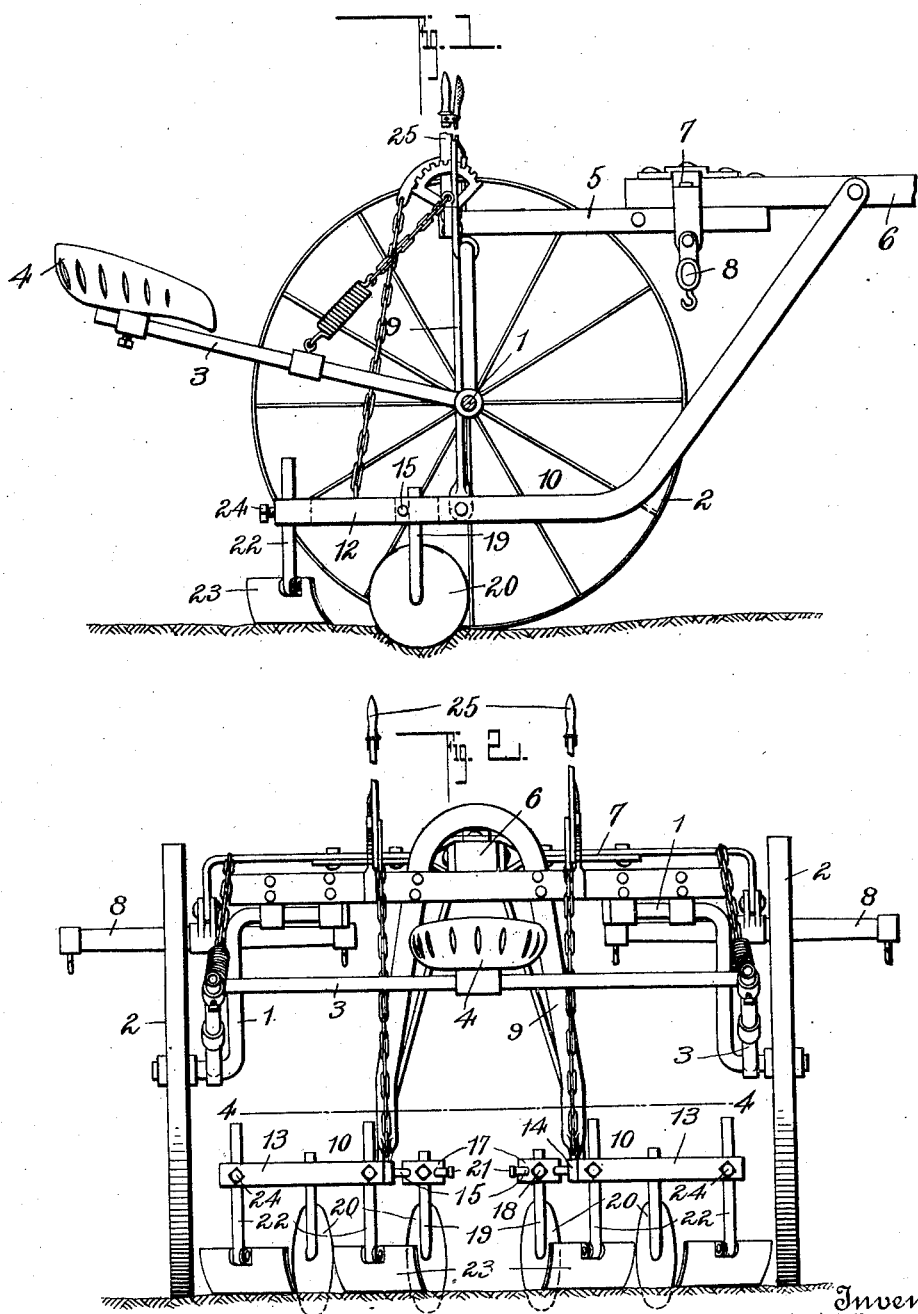

UNITED STATES PATENT OFFICE.

JOHN CHESTER MAXWELL, OF RENSSELAER, INDIANA.

CULTIVATOR.

972,204.  Specification of Letters Patent.  Patented Oct. 11, 1910.

Application filed November 9, 1909. Serial No. 526,991.

*To all whom it may concern:*

Be it known that I, JOHN CHESTER MAXWELL, a citizen of the United States, residing at Rensselaer, in the county of Jasper and State of Indiana, have invented certain new and useful Improvements in Cultivators; and I do declare the following to be a full, clear, and exact description of the invention, such as will enable others skilled in the art to which it appertains to make and use the same.

This invention relates to improvements in cultivators.

The object of the invention is to provide a cultivator having an improved construction and arrangement of adjustable weed destroying devices whereby all weeds may be removed close up to the growing plants without injuring the same and means to throw the soil back again toward the plants.

With the foregoing and other objects in view, the invention consists of certain novel features of construction, combination and arrangement of parts, as will be more fully described and particularly pointed out in the appended claim.

In the accompanying drawings, Figure 1 is a side view of a cultivator constructed in accordance with my invention; Fig. 2 is a rear view of the same; Fig. 3 is a central vertical longitudinal section; Fig. 4 is a horizontal sectional view on the line 4—4 of Fig. 2.

In the embodiment of the invention, I provide a supporting frame which may be of the usual or any suitable construction and is here shown and preferably consists of an arched axle 1 on the ends of which are revolubly mounted supporting wheels 2. To the lower ends of the axle 1 is secured a rearwardly projecting seat supporting frame 3, on which is secured the driver's seat 4. To the upper cross bar of the axle is secured the forwardly projecting horizontally disposed tongue supporting frame 5 to which is secured in any suitable manner the draft tongue 6 of the machine. To the tongue 6 is connected a whiffle tree 7 on the ends of which are arranged the usual swingle trees 8.

To the central portion of the axle 1 is connected a depending beam supporting frame 9, to the lower laterally projecting ends of which are secured in any suitable manner the beams 10 of the cultivator. The beams 10 are constructed at their rear ends in the form of open frames comprising inner longitudinally disposed parallel bars 11 and outer angular or obliquely disposed bars 12 which are connected directly to the bars 11 at their forward ends and at their rear ends are connected to the bars 11 by cross bars 13. The forward ends of the bars 11 of the beam frames are inclined upwardly at their forward ends and are secured to the tongue in any suitable manner.

In the bars 11 and 12 of the beam frame are formed alined suitably disposed guiding sleeves 14 in which are slidably and adjustably mounted the supporting bars 15, said bars being secured in laterally adjusted position by set screws 16.

On the disk supporting bars 15 are secured inner and outer disk holding collars 17, said collars being preferably provided with transversely disposed passages which are engaged with the bars 15 whereby the collars are adjustably mounted on the bars. The collars 17 are held in their adjusted position on the bars 15 by means of set screws 18, arranged in said collars as shown.

In the collars 17 are adjustably secured the vertically disposed shanks 19 of weeding disks 20, which are preferably of circular concavo-convex form. The shanks of the disks 20 are preferably adjustably secured in the collars 17 by means of set screws 21. By adjustably securing the collars 17 to the bars 15, said collars may be adjusted laterally to bring the disks nearer to or farther from the rows of plants, thus providing for the effectual removal of all the weeds up to the rows.

By means of the adjustable connection for the shanks of the disks, the latter may be turned at any desired angle and may be raised or lowered to work the ground deeply or shallow, as may be desired.

At the opposite corners of the frame formed by the side bars 11 and 12 and the rear cross bars 13 are formed boxes having vertically disposed passages in which are adjustably secured the shanks 22 of scraping or covering blades 23. The blades 23 are provided to scrape the soil back toward the rows of plants after the same has been cultivated and the weeds destroyed by the disks 20. By adjustably securing the shanks of the blades 23, the latter may be turned at any suitable angle and may be raised or lowered to the desired elevation.

If desired, the machine may be provided with the usual or any suitable form of raising or lowering levers 25, which are connected to the beam frame in any suitable manner whereby the latter may be lifted up thus raising the disks 20 and the blades 23 out of engagement with the ground to facilitate the removal of the machine from one place to another.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:—

In a cultivator, a main supporting frame, a pair of laterally spaced approximately triangular cultivator frames carried thereby, the side pieces of each frame having a pair of alined bearing sleeves, disk-supporting bars mounted for endwise adjustment in the bearing sleeves of said cultivator frames, disk-holding collars mounted for lateral adjustment of said bars, cultivating disks mounted for angular adjustment in said collars and a pair of scraping blades mounted for vertical and angular adjustment at the rear end of each of said cultivator frames.

In testimony whereof I have hereunto set my hand in presence of two subscribing witnesses.

JOHN CHESTER MAXWELL.

Witnesses:
WILLIAM H. PARKINSON,
WILLIS A. LUTZ.